US008998085B2

United States Patent
McHale et al.

(10) Patent No.: US 8,998,085 B2
(45) Date of Patent: Apr. 7, 2015

(54) OPTICAL DEVICE CONFIGURED TO DETERMINE A PREY SCORE OF ANTLERED PREY

(71) Applicants: John Francis McHale, Austin, TX (US); Douglas Ainsworth Scott, Bracknell (GB)

(72) Inventors: John Francis McHale, Austin, TX (US); Douglas Ainsworth Scott, Bracknell (GB)

(73) Assignee: TrackingPoint, Inc., Pflugerville, TX (US)

( * ) Notice: Subject to any disclaimer, the term of this patent is extended or adjusted under 35 U.S.C. 154(b) by 74 days.

(21) Appl. No.: 13/716,033

(22) Filed: Dec. 14, 2012

(65) Prior Publication Data
US 2014/0165447 A1  Jun. 19, 2014

(51) Int. Cl.
G06G 7/80 (2006.01)
F41G 1/38 (2006.01)
F41G 3/06 (2006.01)
F41G 3/16 (2006.01)
H04N 7/18 (2006.01)

(52) U.S. Cl.
CPC .. F41G 1/38 (2013.01); F41G 3/06 (2013.01); F41G 3/165 (2013.01); H04N 7/18 (2013.01)

(58) Field of Classification Search
USPC .................. 235/400, 414; 356/4.01; 382/110
See application file for complete search history.

(56) References Cited

U.S. PATENT DOCUMENTS

| 5,616,903 A * | 4/1997 | Springer ........................ 235/414 |
| 7,711,151 B2 * | 5/2010 | Jurk .............................. 382/110 |
| 7,738,082 B1 * | 6/2010 | Peters .......................... 356/4.01 |
| 2011/0311109 A1 * | 12/2011 | Demarais et al. ............. 382/110 |
| 2012/0046100 A1 * | 2/2012 | Roman et al. ................... 463/30 |

* cited by examiner

Primary Examiner — Daniel Hess
(74) Attorney, Agent, or Firm — Cesari & Reed LLP; R. Michael Reed (57) ABSTRACT

An optical apparatus includes an optical sensor configured to capture a digital image of an animal within a view area, a processor coupled to the optical sensor, and a memory coupled to the processor. The memory is configured to store instructions that, when executed, cause the processor to determine a distance to the animal, determine edges of the animal, and calculate measurements of selected portions of the animal in response to determining the edges and the distance. The memory further stores instructions that, when executed, cause processor to automatically calculate a prey score for the animal in response to calculating the measurements.

19 Claims, 7 Drawing Sheets

OPTICAL DEVICE CONFIGURED TO DETERMINE A PREY SCORE OF ANTLERED PREY

FIELD

The present disclosure is generally related to scoring prey, and more particularly to a digital optical device that is configured to determine a prey score of antlered prey (i.e., animals that have antlers).

BACKGROUND

Some states place restrictions on hunters regarding such things as type of animal, gender of the animal, the size of the animal, and so on, that a hunter may be permitted to kill in a given hunting season. Further, some states also require the particular prey to have a certain antler characteristics, such as, the number of points on its antlers. It may be difficult to determine, from a distance, whether a particular target can be shot under the particular state's hunting regulations.

In addition to regulatory considerations, some hunters may also want additional information or verification that an animal that he/she is hunting is above a pre-determined level in terms of a trophy specimen. As a hunter approaches his or her limit, he or she may wish to be more selective in terms of target selection. In a particular example, a hunter may elect to hunt for a trophy specimen, such as a deer that would qualify on the Boone and Crockett® scale (for guns) or on the Pope and Young® scale (for bows). However, even experienced hunters may struggle to estimate the relative value of a given target, particularly at an unknown distance. Unfortunately, to determine a prey score for a particular target, a hunter often has to kill the animal and then perform a series of measurements.

SUMMARY

In an embodiment, an optical apparatus includes an optical sensor configured to capture a digital image of an animal within a view area, a processor coupled to the optical sensor, and a memory coupled to the processor. The memory is configured to store instructions that, when executed, cause the processor to determine a distance to the animal, determine edges of the animal, and calculate measurements of selected portions of the animal in response to determining the edges and the distance. The memory further stores instructions that, when executed, cause processor to automatically calculate a prey score for the animal in response to calculating the measurements.

In another embodiment, a method of automatically determining a prey score for an animal includes determining a range to a selected target using an optical device and capturing an image of the selected target using the optical device. The method further includes automatically determining measurements corresponding to the selected target using the optical device and automatically calculating a prey score corresponding to the selected target in response to determining the measurements.

In still another embodiment, a rifle scope includes an optical sensor configured to capture a digital image of an animal within a view area, a processor coupled to the optical sensor, and a memory coupled to the processor. The memory is configured to store instructions that, when executed, cause the processor to determine a distance to the animal, determine edges of the animal and calculate measurements of selected portions of the animal in response to determining the edges and the distance. The memory further includes instructions that, when executed, cause the processor to automatically calculate a prey score for the animal in response to calculating the measurements.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of an optical device and methods are described below that is configured to automatically determine a prey score for a selected target and to present the prey score to user. The optical device may be a spotting scope, a telescope, a rifle scope, or some other digital optical device that can determine a distance to a selected target, capture an image of the selected target, optically measure one or more parameters associated with the selected target, and automatically calculate a prey score based on the measurements. As used herein, the term "prey score" refers to a numeric value derived from a plurality of measurements. The optical device provides a "preliminary prey score" based on optical measurements, since certain standards organizations may require a cure time of about 60 days before the official prey score measurements are to be taken. Since the optical device is configured to capture the prey score values at the time of the hunt and before the animal is killed by the hunter, the prey score provided by the optical device is an unofficial or preliminary score, which is provided to the user only for informational purposes.

In one example, the optical device is configured to selectively project at least a portion of the image to determine at least one of a front view and a side view for capturing optical measurements. In a particular example, the optical device may be configured to optically process the portion of the image using feature detection and pattern recognition techniques, to identify a type of animal, to select a prey scoring algorithm corresponding to the type of animal, and to adjust the image to provide a suitable view (such as a front view and/or a side view) for capturing the measurements for the particular type of prey and according to a particular scoring standard, such as the Boone and Crockett® scale (for hunting with guns) or the Pope and Young® scale (for hunting with a bow and arrow). The projection process can take an internal three-dimensional mode representation of a head of the animal and can project/render a wireframe side view, for example, using for example the features and patterns determined by the above-mentioned recognition techniques. Once the measurements are determined, the optical device determines the prey score by inserting the measurement values into an algorithm associated with the particular scale to provide a preliminary prey score.

In general, the optical device may be produced in a variety of designs. One possible example of an embodiment of an optical device configured to determine a prey score is described below with respect to FIG. 1.

Figure 1:
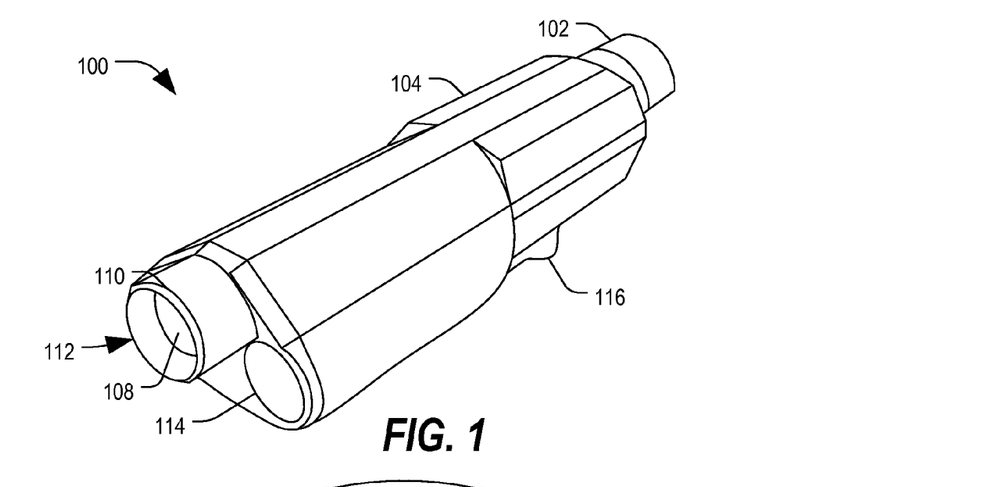
FIG. 1 is a perspective view of an optical device configured to determine a prey score.

FIG. 1 is a perspective view of an optical device 100 configured to determine a prey score. Optical device 100 includes an eyepiece 102 through which a user may look to see a view area. Optical device 100 further includes a housing 104 that defines an enclosure sized to secure circuitry and sensors, such as optical sensors, motion and/or orientation sensors, laser range finder circuitry, image processing circuitry, and the like. Laser range finder circuitry is used to determine a distance to a target. Image processing circuitry is configurable to digitally magnify and process optical data captured by the optical sensors, to selectively project a portion of an image of a target based on an internal three-dimensional representation of the head of an animal to render a wireframe-type representation of the portion (side-view or front-view), and process the portion to calculate measurement data using the distance information to calibrate the measurements.

Optical device 100 further includes a lens portion 110 including an objective lens 108 for focusing light toward the optical sensors. Optical device 100 further includes a laser rangefinder transmitter 112 and a laser rangefinder receiver 114 for transmitting a laser beam toward the aim-point and for receiving reflections of the laser beam to determine a distance to the target. Additionally, optical device 100 includes one or more ports 116 configurable to couple to an external device, such as a smart phone, laptop or tablet computer, or other computing device to transfer information and/or instructions, bi-directionally. In an example, a plurality of prey types and/or algorithms for calculating prey scores may be updated with new prey types and/or new prey scoring algorithms via the one or more ports 116. In another example, during a prey scoring operation, detected features of the antlers and lines indicating corresponding measurements may be presented to the user on a display of the external device, and the user may interact with the external device to provide user-feedback regarding feature detection and measurement in terms of confirming correct detection of key features of the antler.

Optical device 100 may include one or more user-selectable buttons to receive a user input, such as a target selection input. Alternatively, optical device 100 may include one or more motion sensors to detect a directed aiming event, such as when a user attempts to point the optical device 100 toward a target within the view area for a period of time, and may select the target in response to detecting the directed aiming event. In another embodiment, the user may interact with an electronic device coupled to the one or more ports (or configured to communicate wirelessly with a radio frequency transceiver within housing 104) to select a target within the view area. Optical device 100 is configured to perform feature detection and/or pattern recognition on a portion of a selected target (such as the antlers of a deer) to identify the boundaries and contours. Optical device 100 determines a distance to the selected target using laser range finder circuitry (including laser rangefinder transmitter 112 and laser rangefinder receiver 114), and uses the distance data as one of the inputs for the determination of the measurements of the portion of the target. In some instances, image processing circuitry may alter the portion (such as by projecting or otherwise manipulating the image data) to produce at least one of a front view and a side view (which may not be displayed to the user) for the purpose of determining the measurements. One possible example of a target within a view area of optical device 100 is described below with respect to FIG. 2

Figure 2:
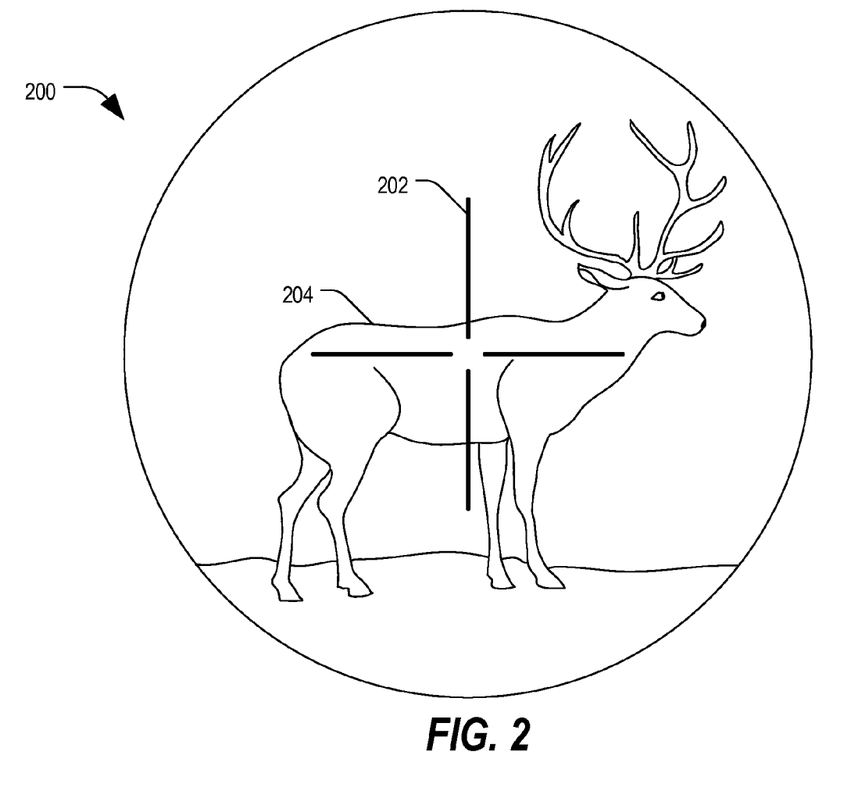
FIG. 2 is diagram of an illustrative example of an image of a deer within a view area of the optical device of FIG. 1.

FIG. 2 is diagram of an illustrative example of an image of a deer 204 within a view area 200 of optical device 100 of FIG. 1. In this example, a reticle 202 is centered within the view area 200 and a center of reticle 202 is aligned to a mid-section of deer 204. In response to explicit user input (such as a button press) or implicit user input (such as detection of a directed aiming event), optical device 100 identifies deer 204 as a selected target.

Figure 3:
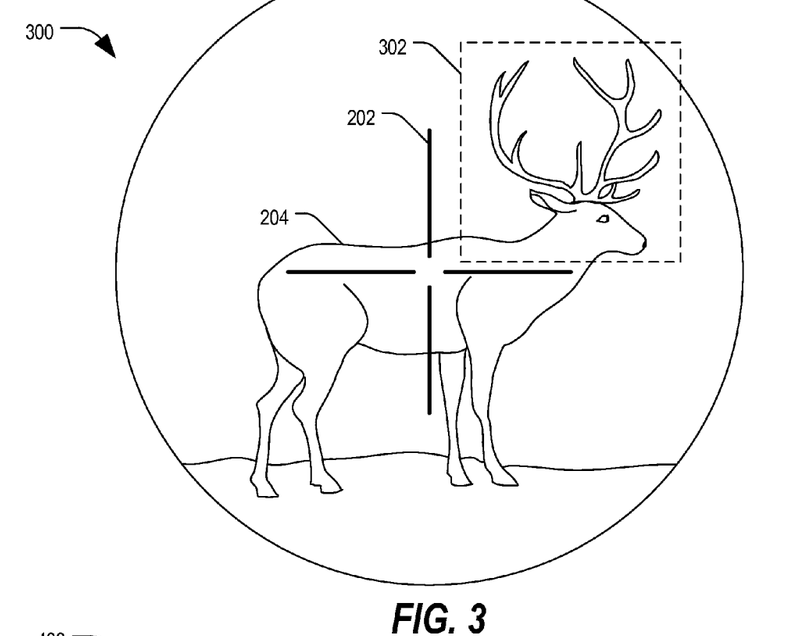
FIG. 3 is a diagram of an illustrative example of the image of FIG. 2 including a portion selected for image processing to determine the prey score.

FIG. 3 is a diagram of an illustrative example 300 of the image of deer 204 of FIG. 2 including a portion 302 selected for image processing to determine the prey score. Image processing circuitry of optical device 100 may perform edge and blob detection to determine boundaries and contours of the portion 302. If sufficient information is available based on the vantage point at which the image of deer 204 is captured, the portion 302 may be projected or otherwise adjusted to produce a front or side view in order to determine dimensions of the antlers in order to determine the prey score. In an example, the portion may be projected using an internal three-dimensional mode representation of the head and antlers and can project/render a wireframe side view, for example. However, in some instances, because of low contrast, poor visibility, darkness, orientation, visual interference, or other deficiencies, the portion of the image may provide insufficient information for image processing circuitry to determine various measurements. An example of one possible method for selectively projecting the image to determine a prey score is described below with respect to FIG. 4.

Figure 4:
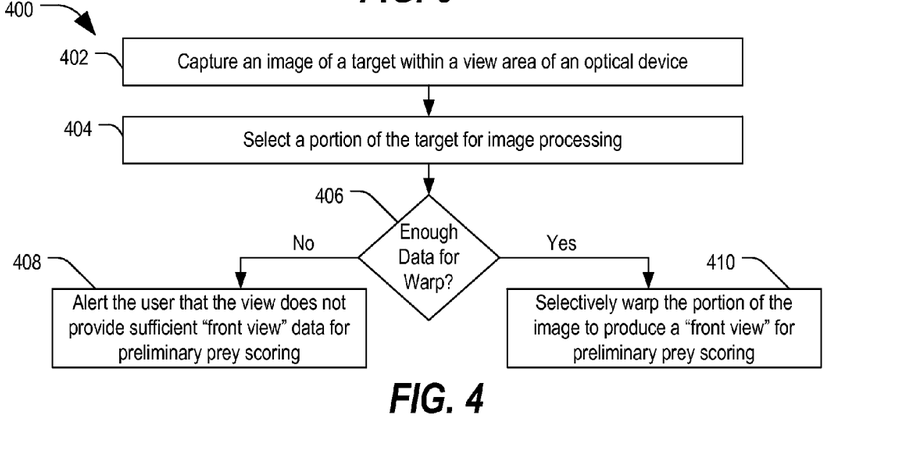
FIG. 4 is a flow diagram of a method of processing the portion to determine if there is enough data to calculate the prey score.

FIG. 4 is a flow diagram of a method 400 of processing the portion to determine if there is enough data to calculate the prey score. At 402, image sensors capture an image of a target within a view area of an optical device. Advancing to 404, an image processor within the optical device selects a portion of the target for image processing. In an example where the target is a deer, the image processor may select a portion that includes the head and the antlers for feature detection and pattern recognition. Continuing to 406, if there is not enough data to perform an image projection operation, the method proceeds to 408 and the image processor provides an alert to the user that the view (or vantage point) does not provide sufficient "front view" data for preliminary prey scoring. The alert may be a red dot or a flashing text message on a display within the optical device that says, for example, "poor vantage point", "insufficient data for scoring", or "prey scoring needs more of a front view". In an example, a complete profile view without a partial front view may provide insufficient information for the image processor to disambiguate the left and right antlers and/or to determine (even preliminarily) the width between antlers or tip-to-tip spacing between left and right antlers, for example.

At 406, if there is sufficient data, method 400 proceeds to 410 and the image processor selectively projects the portion of the image to produce a "front view" for preliminary prey scoring. In an example where the target is a deer, the image processor may project the image to produce a side view of the antlers to measure the lengths of the various points. Depending on the vantage point, it may not be necessary for the image processor to project the image to provide the front view. If the current image presents a front view, the image processor may skip the projecting of the image to present a front view and provide a side view instead.

It should be appreciated that the projected views may not actually be presented to a display of the optical device 100. Instead, the projected views (front and/or side) may be used internally for capturing the optical measurements. In the image of deer 204, the side view may provide insufficient information for optical measurements of the antlers. An example of an image that includes suitable information to permit image projecting is described below with respect to FIG. 5.

Figure 5:
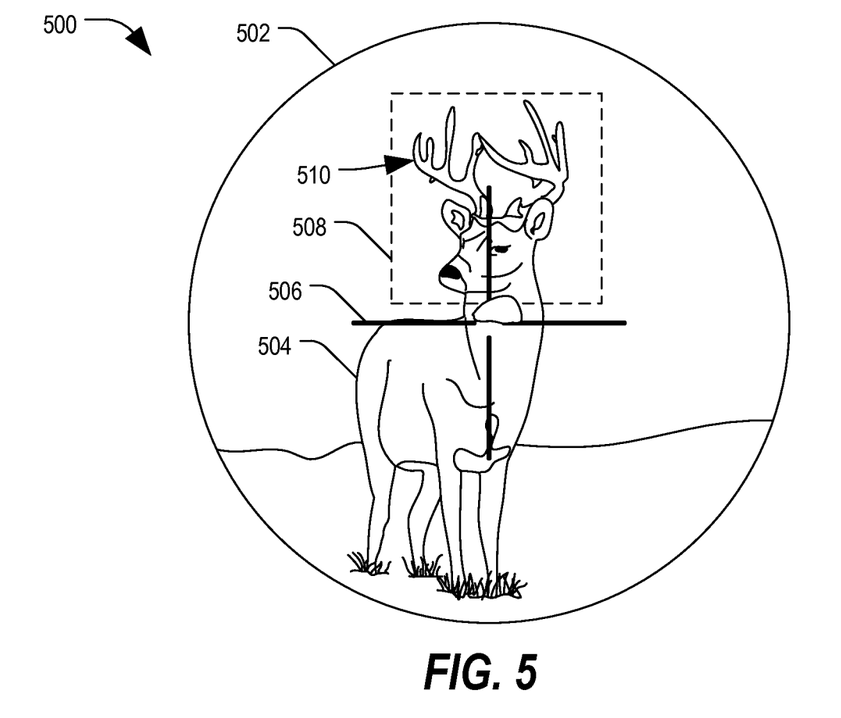
FIG. 5 is a diagram of an illustrative example a second image of a deer within a view area of the optical device of FIG. 1.

FIG. 5 is a diagram of an illustrative example 500 a second image of a deer 504 within a view area 502 of optical device 100 of FIG. 1. Reticle 506 is centered within view area 502 and is aligned to deer 504. In this example, deer 504 is partially facing the viewer with its head turned at an angle. This vantage point provides sufficient information for determining measurements of antlers 510. The image processor of optical device 100 selects a portion 508 of the image that includes the head and antlers for further processing.

It should be understood that this selection is illustrative only, and that the portion 508 may include the antlers and just the top of the head where the antlers connect. Further, the portion 508 may not be highlighted or selected within a dashed box as shown. Instead, such processing may occur in the background in a fraction of a second as the user continues to observe the deer. Optical device 100 determines a range to deer 504 and then processes the image, optionally projecting the image to provide the optical data in one or more suitable views to the image processor for measurement purposes. Examples of adjusted or projected views of the portion 508 of the image are described below with respect to FIGS. 6 through 8.

Figure 6:
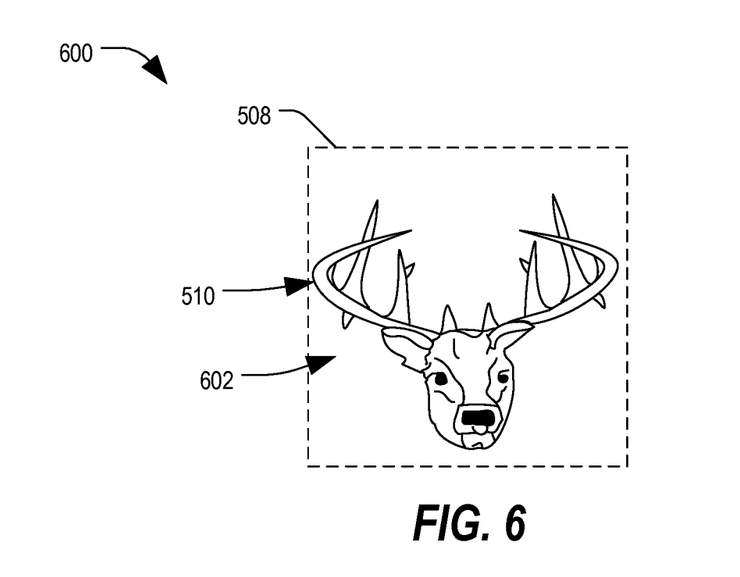
FIG. 6 is a diagram of an illustrative example of an adjusted version of a selected portion of the deer of FIG. 5 projected to present a front view.

FIG. 6 is a diagram of an illustrative example of an adjusted version 600 of a selected portion 508 of the image of deer 504 in FIG. 5, which portion 508 is projected to present a front view. In this illustrative example, the antlers 510 are presented in a front view as generally indicated at 602.

To adjust the view or "project" the image as shown, there are many possible techniques that can be used. In a particular example, the image processor feature detection and pattern recognition to identify boundaries and contours of antlers 510. Further, once the boundaries and contours are identified, image processor places anchor points on symmetric boundaries and contours and then shifts the pixel data at the anchor point locations to be symmetrical about an axis within an array of pixels. In the process of shifting, the positions of pixels adjacent to the selected anchor points may be shifted less, effectively projecting some of the edges to correspond to changes in the orientation of particular edges or contours (features or patterns). The image processor may then interpolate missing information from the available information to provide a "front view" having substantially symmetric information (and including imperfections that may undermine perfect symmetry) that can be used to determine measurements optically as described below with respect to FIG. 7.

Figure 7:
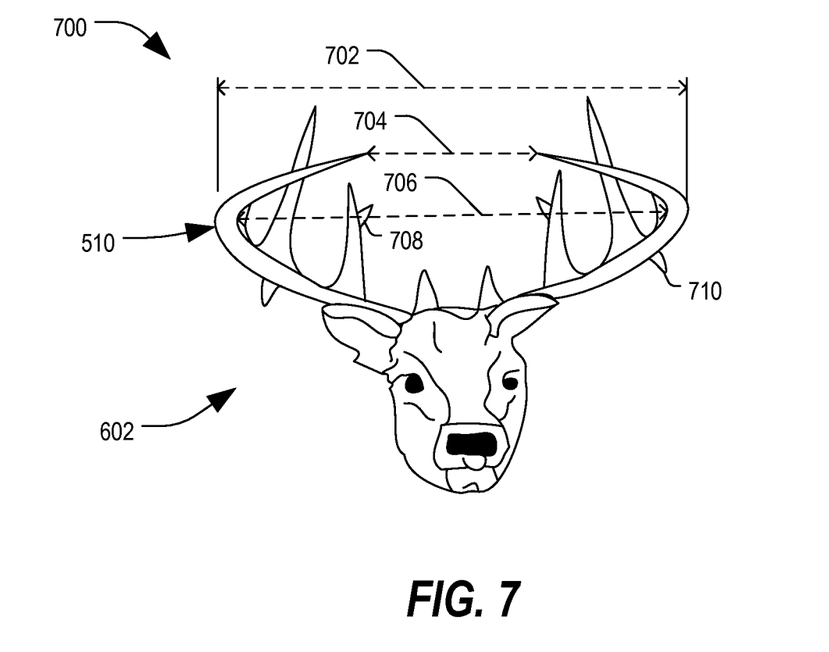
FIG. 7 is a diagram of an illustrative example of some of the optical measurements of antlers of the front view of FIG. 6.

FIG. 7 is a diagram of an illustrative example 700 of some of the optical measurements of antlers 510 of the front view 602 of FIG. 6. In this example, the image processor determines a greatest spread at 702, which is measured between perpendicular portions of the main beams of antlers 510 at a right angle to the center line. Additionally, the image processor calculates a tip-to-tip spread 704 between tips of the main beam. Further, the image processor calculates an inside spread 706 of the main beams, which is measured at a right angle to the center line of the head of the deer at the widest point between the main beams. Further, the image processor counts the number of points of the antlers that have a length of at least one inch and including the point of the main beam. Additionally, the image processor may identify abnormal points (such as point 710) that originate from atypical locations (such as the bottom or side of the main beam) or extra points (such as point 708) beyond a normal pattern (such as points that originate from other points).

To measure the lengths of the various points, the image processor measures the total lengths of each of the abnormal beams from the center of the outside edge to the tip of the beam. The main beam is measured from the center of the lowest outside edge of the burr over the outer side to the most distant point of the main beam. The lengths of the normal points are measured from the nearest edge of the main beam over the outer curve of the tip. Further, the circumference of the main beam may be calculated at various points along the main beam, including, for example, at a smallest place between the burr and a first point, at a smallest place between the first and second points, at a smallest place between the second and third points, and so on. In some examples, the image processor may project the image to present a side view in order to take the measurements. To project the image, the image processor may place anchor points on edges and contours and shift the anchor points, adjusting edge pixels between anchor points a different amount in order to project the image to present a profile view in order to measure some of the points as described with respect to FIG. 8.

Figure 8:
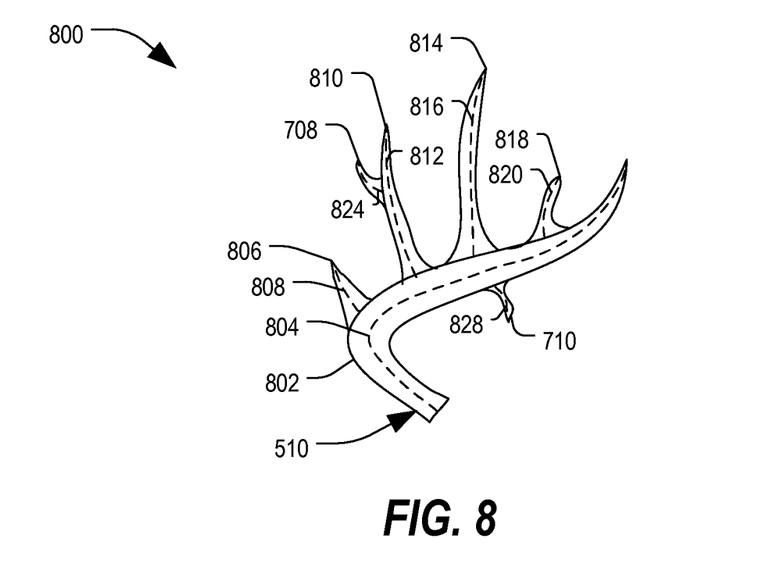
FIG. 8 is a diagram of an illustrative example of additional prey scoring measurements of the antlers of the deer from a side view produced through projecting of the portion of the image.

FIG. 8 is a diagram of an illustrative example of additional prey scoring measurements of the antlers 510 from a side view 800 produced through projecting of the portion 508 of the image. In side view 800, the main beam 802 and its corresponding measurement line 804 are shown. Further, points 806, 810, 814, and 818 are shown with corresponding measurement lines 808, 812, 816, and 820. Additionally, abnormal points 708 and 710 and their respective measurement lines 824 and 828 are shown.

In general, the length measurements are calculated along a contour of the particular point, from its base to its tip. Additionally, circumferential measurements may be calculated at the narrowest points along the length of the main beam between the base and the first point and between each of the points in order to complete the measurements. This process is repeated for the left and right views of the antlers.

The image processor populates a table with the measurement data. An example of an incomplete table is presented below in TABLE 1 that is based on the Boone and Crockett® measurements.

TABLE 1

Boone and Crockett ® Measurements.

| Measurement | Right | Left | Difference |
|---|---|---|---|
| Length of Main Beam | | | |
| Length of First Point | | | |
| Length of Second Point | | | |
| Length of Third Point | | | |
| Length of Fourth Point | | | |
| Length of Fifth Point | | | |
| Length of Sixth Point (if present) | | | |
| Length of Seventh Point (if present) | | | |
| Circumference between burr and first point | | | |
| Circumference between the first and second points | | | |
| Circumference between the second and third points | | | |
| Circumference between the third and fourth points | | | |
| Circumference between the fourth and fifth points | | | |
| Circumference between the fifth and sixth points (if present) | | | |
| Circumference between the sixth and seventh points (if present) | | | |

Additionally, the measurements of the various abnormal points may also be stored in the table or in a different table. Once the measurements are taken, the measurements in the "Right" column are added together, the measurements in the "Left" column are added together, and the totals are added together with a "spread credit" that corresponds to the length of the longer of the left or right main beam to produce a subtotal prey score. The differences in the "Difference" column are added together, and the sum is subtracted from the subtotal prey score to produce a prey score.

In general, it should be appreciated that the scoring algorithm described with respect to Table 1 corresponds to a typical (or atypical) whitetail or Coues' deer. Other measurements and other algorithms may be used to score other types of antlered animals, such as elk, moose, and so on. The user may manually identify the animal using buttons on the optical device or on an associated handheld computing device, such as a smart phone, tablet, personal digital assistant, or other computing device. Alternatively, optical device 100 may automatically identify the type of antlered animal based on the boundary and blob detection operations. Once the type of antlered animal is identified, the image processor of optical device 100 may select the instructions corresponding to the particular type of animal and/or to the particular standard and determine the various measurements for the animal based on the animal type. It should be understood that different standards may arrive at a prey score through different measurements, and that such standards may depend on geographic location as well as the type of weapon being used (e.g., gun versus bow and arrow). Further, if certain sighting devices or ranging devices can nullify the score and/or reduce the score within a particular standard, in some examples, optical device 100 may incorporate such reductions in the preliminary prey score.

In an embodiment, optical device 100 may present the antlers 502 together with an optical indicator showing the measurement lines between tips or points of the antlers 502. In one example, the measurement lines may be presented as a graduated ruler rendered graphically from antler tip to antler tip. Optical scope 100 may further provide one or more user-selectable options configured to receive user feedback as to the "correct" detection of key features of the antlers.

In general, any number of antlered animal types may be scored using optical device 100. Such animals include, but are not limited to, elk, deer, moose, caribou, pronghorn, bison, goats, musk ox, and other antlered animals.

Figure 9:
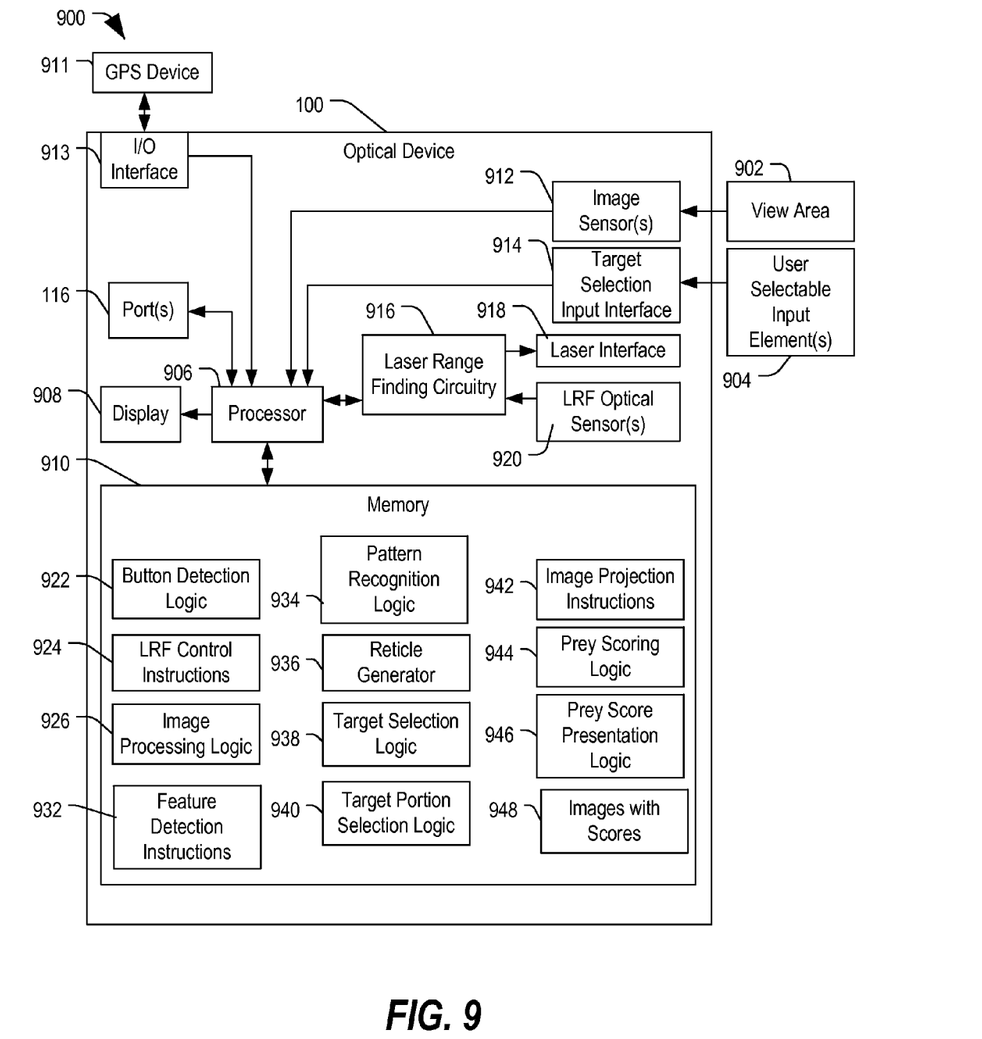
FIG. 9 is a block diagram of a system including the optical device of FIG. 1.

FIG. 9 is a block diagram of a system 900 including the optical device 100 of FIG. 1. Optical device 100 is configured to capture images of a view area 902 and is responsive to signals from one or more user-selectable input elements 904 (such as buttons that can be positioned on the outside of optical device 100, on a handle of a firearm, or such as input signals from a touch-sensitive interface of a portable computing device, such as a smart phone, a tablet computer, or another computing device).

Optical device 100 includes a processor 906, which can be a general purpose processor configurable to execute instructions stored in a memory 910. Processor 906 is coupled to a display 908 configured to present visual information to a user through lens 102. Processor 906 is also coupled to an input/output (I/O) interface 913, which can be configured to communicate with a global positioning satellite (GPS) device 911, such as a smart phone or other electronic device including a GPS circuit, to receive GPS data corresponding to a physical location of the GPS device, which position information can be provided to optical device 100. Processor 906 is also coupled to one or more image sensors 912 configured to capture image data corresponding to view area 902 through objective lens 108.

Processor 906 is also coupled to target selection input interface 914, which is configured to receive signals from user selectable input elements 904 and to provide the signals to processor 906. Additionally, processor 906 is coupled to laser range finder (LRF) circuitry 916, which controls a laser interface 918 to direct a laser beam toward the target by controlling laser rangefinder transmitter 112 and which receives a signal from LRF optical sensors 920 (which may include laser rangefinder receiver 114) that corresponds to the reflected beam. LRF circuitry 916 uses the signal to determine the distance to the target and provides the distance to processor 906.

Memory 910 stores data and stores instructions that, when executed by processor 906, cause processor 906 to process at least a portion of a target within an image of the view area 902 to determine measurements and to calculate a prey score based on those measurements. Memory 910 includes button detection logic 922 that, when executed, causes processor 906 to determine the timing of a button press relative to an aim point of the optical device 100. Memory 910 further includes LRF control instructions 924 that, when executed, causes processor 906 to control LRF circuitry 916 to determine a range to the selected target within view area 902.

Memory 910 includes feature detection instructions 932 that, when executed, causes processor 906 to process image data from image sensors 912 to determine edges boundaries, and/or other features of a selected target within the view area 902. Memory 910 further includes blob detection logic 934 that, when executed, causes processor 906 to process the image data within the determined boundaries or edges to determine contours and curves of the selected target. Memory 910 also includes a reticle generator 936 that, when executed, causes processor 906 to provide a reticle at a center of a displayed portion of the view area 902. Memory 910 further includes target selection logic 938 that is configured to select a target within the view area 902, either automatically, based on implicit user input (such as aiming of the optical device toward the target for a period of time), or based on manual input detected using button detection logic 922. Processor 906 executes target portion selection logic 940 to select a portion of the selected target for further processing in order to calculate measurements for the purpose of calculating a prey score. Processor 906 may execute image projection instructions 942, as needed, to adjust the image data of the selected portion to facilitate optical measurements. Such projection may include placing anchor points on symmetric elements of the selected target and shifting the pixel data of those anchor points to symmetric locations about an axis, shifting adjacent image data appropriately to rotate or otherwise adjust the portion to provide the desired vantage point data for measurement. During this process, image projection instructions 942 make use of the detected edges and contour information to calculate the adjusted image data.

Memory 910 further includes prey scoring logic 944 including prey scoring instructions. Processor 906 selectively executes the prey scoring logic 944 to determine what vantage points are needed for measurement, to determine what measurements are to be taken, and to calculate measurement data based on the image data for each of the various measurements needed to complete the prey score. Processor 906 further executes prey scoring logic 944 to calculate the prey score for the selected target.

Figure 11:
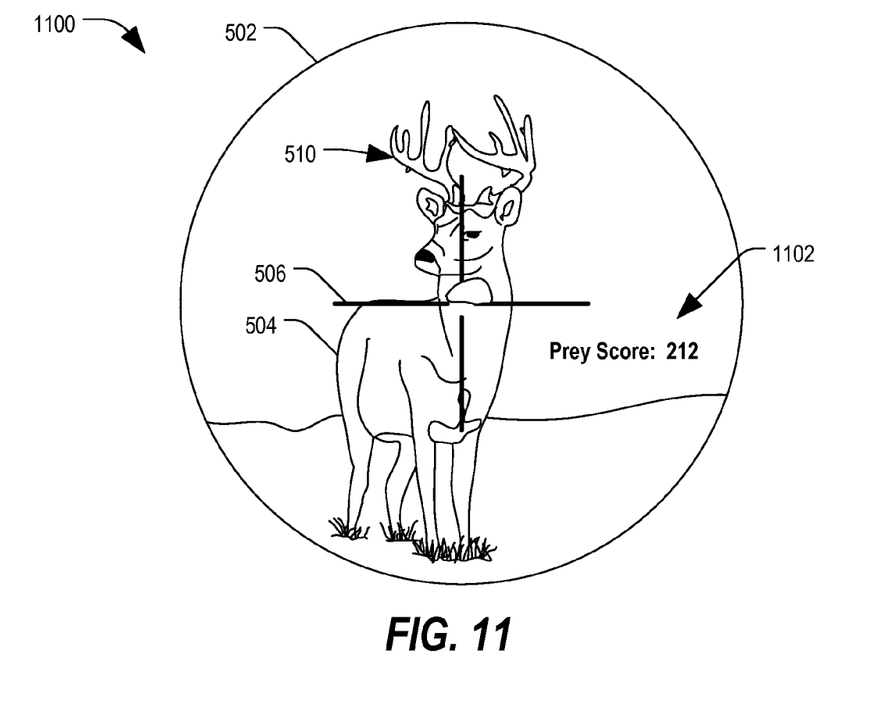
FIG. 11 is an illustrative example of the image of FIG. 5 including a prey score.

It should be appreciated that the prey score is preliminary and may not take into account other measurements or considerations that may impact an official prey score, but it provides insight to the hunter before a shot is even fired, allowing the hunter to base hunting decisions, at least partially, on the preliminary prey score. To that end, memory 910 further includes prey score presentation logic 946 that, when executed, causes processor 906 to present the preliminary prey score calculation to display 908 (as shown in FIG. 11). Memory 910 may also store images 948 and their associated prey scores for later retrieval and review.

In general, optical device 100 may be a spotting scope, a rifle scope, or some other optical device that allows the user to evaluate or observe a potential target. By providing a preliminary prey score to the user, the user can make firing or other decisions with more information about a potential target than was previously available.

Figure 10:
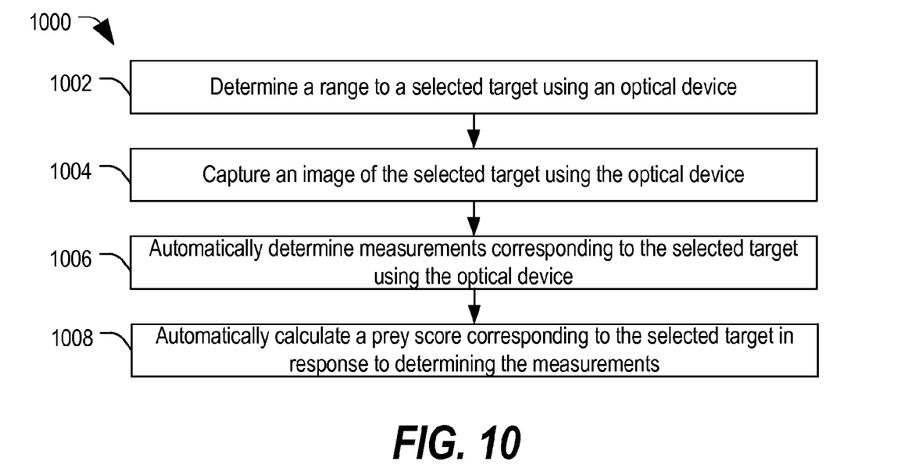
FIG. 10 is a flow diagram of an embodiment of a method of determining a prey score for a selected target.

FIG. 10 is a flow diagram of an embodiment of a method 1000 of determining a prey score for a selected target. At 1002, optical device 100 determines a range to a selected target. The range may be determined using LRF circuitry 916 or through image processing techniques, depending on the particular implementation. Advancing to 1004, optical device 100 captures an image of the selected target. Continuing to 1006, the optical device 100 automatically determines measurements corresponding to the selected target. In an example, optical device 100 determines measurements using the LRF information in conjunction with optical measurements of various portions of the selected target. Optical device 100 may feature detection and pattern recognition to determine boundaries and curvatures of at least a portion of the selected target. In some cases, optical device 100 may project a portion of the image (using the boundary and contour information) to adjust the vantage point to facilitate optical measurements. Proceeding to 1008, optical device 100 automatically calculates a prey score corresponding to the selected target in response to determining the measurements.

As discussed above, the measurement data may be presented to the user on the display 908. One possible example of such a presentation is described below with respect to FIG. 11.

FIG. 11 is an illustrative example 1100 of the image of deer 504 within a view area 502 of FIG. 5 including a prey score 1102. Reticle 506 is centered within view area 502 and is aligned to deer 504. In this example, deer 504 is partially facing the viewer with its head turned at an angle. This vantage point provides sufficient information for determining measurements of antlers 510. In real-time or near real-time, optical device 100 is configured to calculate the prey score and to present the prey score 1102 on the display.

In this illustrated example 1100, the prey score 1102 is presented in an area within view area 502 that is adjacent to deer 504; however, the prey score 1102 may be on an external device (such as a smart phone or other portable computing device) or may be presented on another area of the screen, such as, for example, on deer 504 or along the peripheral edge of view area 502. Such variations may be implementation specific or may be configurable by a user through interaction with a settings menu. In a particular embodiment, the external device may present the image of the antlers together with a line or other graphic element indicating the detected features being measured. The line or graphic element may be presented, for example, as a graduated ruler or other measurement device, and the external device may provide one or more options accessible by the user to provide feedback to confirm and/or correct the detected measurement points. This indicator may be in addition to determining whether sufficient information is available to make the measurements.

Figure 12:
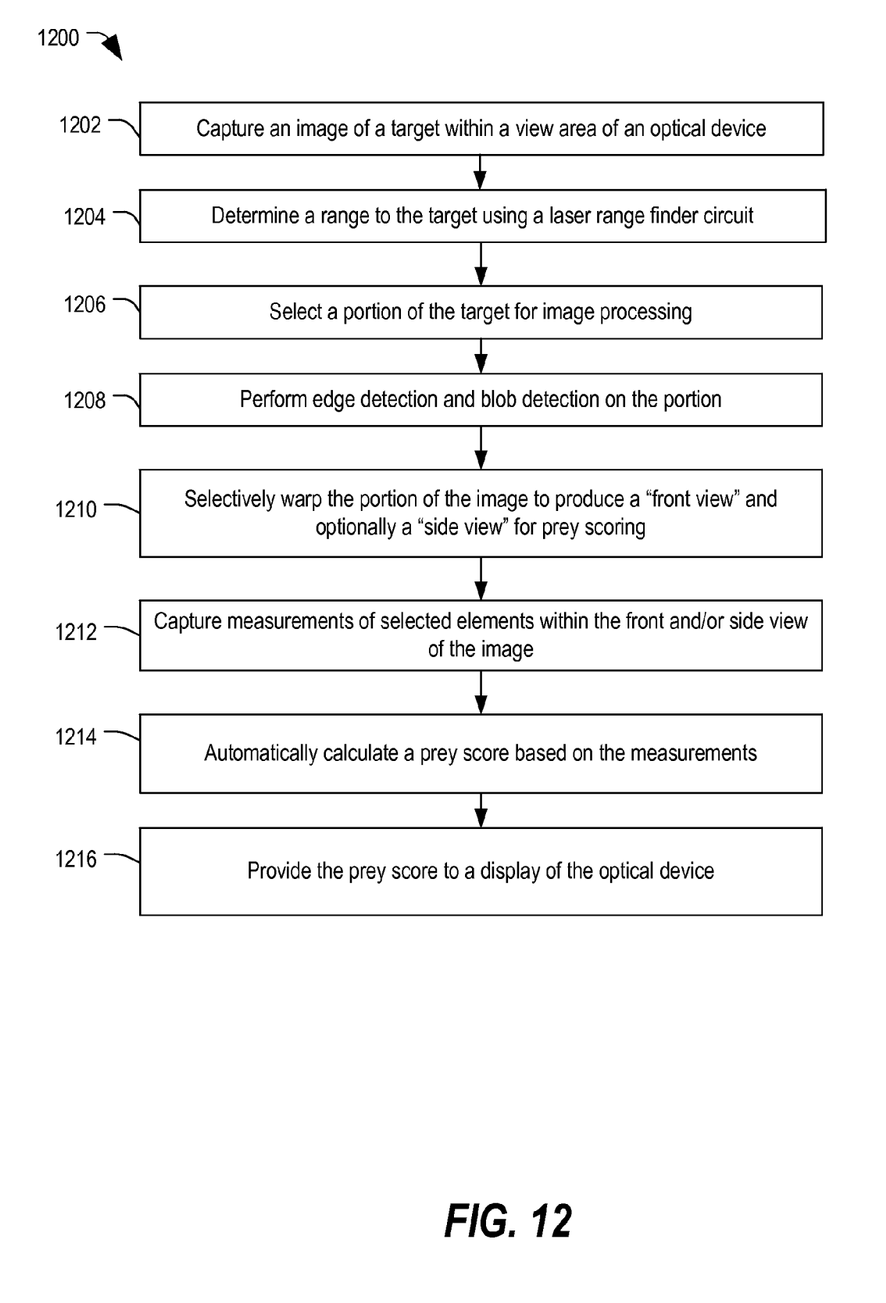
FIG. 12 is a flow diagram of a second embodiment of a method of determining a prey score for a selected target.

FIG. 12 is a flow diagram of a second embodiment of a method 1200 of determining a prey score for a selected target. At 1202, optical device 100 captures an image of a target within a view area. Advancing to 1204, optical device uses a laser range finder circuit to determine a range to the target. Continuing to 1206, an image processor of optical device 100 selects a portion of the target for image processing. Moving to 1208, the image processor performs feature detection and pattern recognition on the selected portion.

Advancing to 1210, optical device 100 selectively projects the portion of the image to produce a "front view" and optionally a "side view" for preliminary prey scoring. Continuing to 1212, optical device 100 captures measurements of selected elements within the front and/or side view of the image.

Advancing to 1214, optical device 100 automatically calculates a prey score based on the measurements. Moving to 1216, optical device 100 provides the preliminary prey score to a display of the optical device.

While the above-examples have focused on prey scoring for a deer, it should be understood that optical device 100 is configured to automatically calculate a preliminary prey score for a variety of antlered animals. Moreover, the user may install updated prey scoring algorithms and information via ports 116, as desired. Moreover, as feature detection and pattern recognition algorithms improve, such instructions may also be upgraded as desired.

In conjunction with the optical device and methods described above with respect to FIGS. 1-12, an optical device is described that is configured to calculate a prey score of an antlered animal based on a distance to the animal and based on optical measurements calculated from an image of the animal. The prey score may be dependent on the type of weapon being used (gun versus bow). The optical device is configured to selectively adjust the vantage point by projecting the image in order to determine the measurements optically, provided sufficient information is available, and to present the calculated prey score to the user via a display. Thus, a user may utilize the optical device to determine a prey score for an antlered animal before harming the animal, allowing the user to factor a possible prey score into a firing decision with respect to the particular animal.

Although the present invention has been described with reference to preferred embodiments, workers skilled in the art will recognize that changes may be made in form and detail without departing from the scope of the invention.

What is claimed is:

1. An optical apparatus comprising:
an optical sensor configured to capture a digital image of an animal within a view area;
a processor coupled to the optical sensor; and
a memory coupled to the processor, the memory configured to store instructions that, when executed, cause the processor to:
determine a distance to the animal;
determine edges of the animal;
automatically select portions of the animal;
determine an orientation of the animal relative to the optical sensor;
selectively process the digital image to digitally adjust the orientation to produce at least one of a head-on view and a side view of the animal based on the digital image;
automatically determine measurements of the selected portions of the animal in response to determining the edges and the distance and based on the at least one of the head-on view and the side view; and
automatically calculate a prey score for the animal in response to calculating the measurements.

2. The optical apparatus of claim 1, further comprising:
laser range finder circuitry coupled to the processor and configured to determine the distance to the animal and to provide a signal corresponding to the distance to the processor; and
wherein the processor determines the distance in response to the signal.

3. The optical apparatus of claim 1, wherein the processor determines the distance to the animal by processing an image of the animal relative to surroundings within the view area.

4. The optical apparatus of claim 1, wherein the prey score comprises a difference between a first prey score including a spread credit between first and second beams of a set of antlers and a sum of differences between measurements of the first and second beams of the set of antlers.

5. The optical apparatus of claim 1, wherein the optical apparatus comprises at least one of a rifle scope, a spotting scope, a prey identification device, a digital camera, and binoculars.

6. The optical apparatus of claim 1, wherein the processor determines the orientation based on symmetry of antlers of the animal.

7. The optical apparatus of claim 1, wherein the processor determines the edges by performing pattern recognition on image data from a portion of the digital image to identify parameters of a selected portion of the animal.

8. The optical apparatus of claim 7, wherein the processor performs feature detection on the portion of the digital image.

9. A method of automatically determining a prey score for an animal, the method comprising:
determining a range to a selected target using a laser range finder circuit of an optical device;
capturing, using an optical sensor of the optical device, an image of the selected target;
determining an orientation of the selected target within the image;
projecting the image of the selected target to provide an adjusted view including at least one of a head-on view and a side view; and
automatically determining, using an image processor that is coupled to the laser range finder circuit and to the optical sensor, measurements corresponding to the selected target based on the range and the adjusted view; and
automatically calculating a prey score corresponding to the selected target in response to determining the measurements.

10. The method of claim 9, wherein optically measuring portions of the selected target comprises:
automatically detecting edges of antlers of the selected target to determine edges of the antlers; and
determining measuring the antlers optically using the detected edges.

11. The method of claim 10, wherein automatically detecting edges of the selected target comprises performing pattern recognition on image data from a portion of the digital image corresponding to the antlers.

12. The method of claim 9, wherein providing the adjusted view comprises:
projecting the image of the selected target to provide a side view of the selected target; and
optically measuring portions of the selected target using the side view to determine the measurements.

13. A rifle scope comprising:
an optical sensor configured to capture a digital image of an animal within a view area;
a processor coupled to the optical sensor; and
a memory coupled to the processor, the memory configured to store instructions that, when executed, cause the processor to:
determine a distance to the animal;
determine edges of the animal;
determine an orientation of the animal based on the digital image;
selectively project the digital image to provide the adjusted view including at least one of a head-on view and a side view of the animal;
automatically determine a plurality of measurements of selected portions of the animal in response to determining the edges and the distance and in response to the adjusted view; and
automatically calculate a prey score for the animal in response to calculating the plurality of measurements.

14. The rifle scope of claim 13, further comprising:
a display coupled to the processor; and
wherein the memory includes instructions that, when executed, cause the processor to provide visual data captured from the view area to the display and to provide the prey score with the visual data on the display.

15. The rifle scope of claim 14, wherein the processor automatically detects the edges of the selected target by performing a fast Fourier transformation on image data from a portion of the digital image corresponding to the antlers.

16. The rifle scope of claim 13, wherein the instructions to determine the edges of the animal include instructions that, when executed, cause the processor to perform pattern recognition to identify parameters of a selected portion of the animal.

17. The rifle scope of claim 13, wherein the memory further comprises instructions that, when executed, cause the processor to automatically detect edges of antlers of the selected target and optically measure the antlers using the detected edges.

18. The rifle scope of claim 13, further comprising:
a laser range finder circuit coupled to the processor; and
wherein the processor determines the distance in response to a signal from the laser range finder circuit.

19. The rifle scope of claim 13, wherein the prey score is automatically calculated from the plurality of measurements without user input.

* * * * *